May 7, 1929.  M. H. ROBERTS  1,712,120
POWER REVERSE GEAR
Filed July 7, 1921
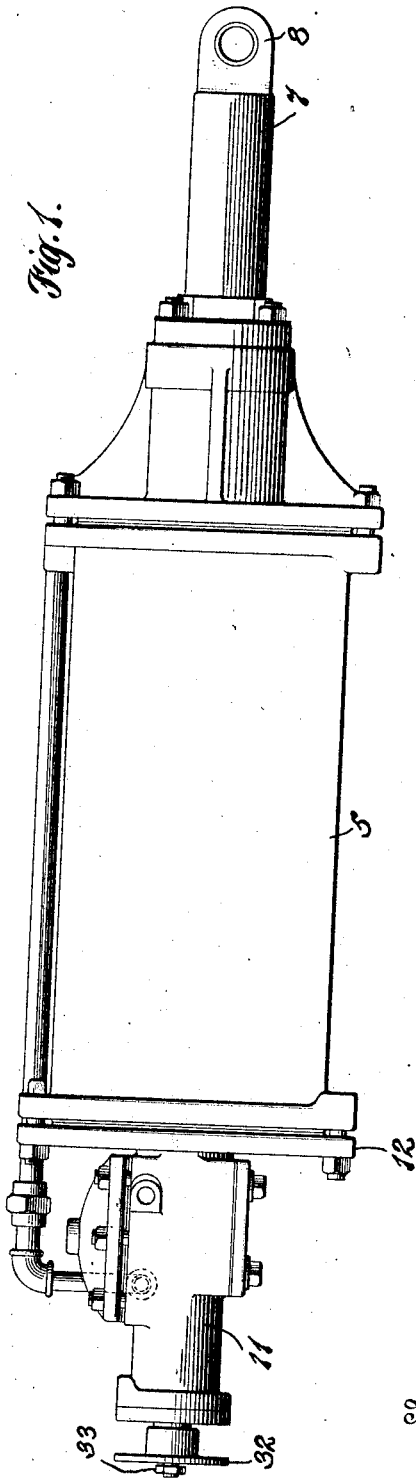
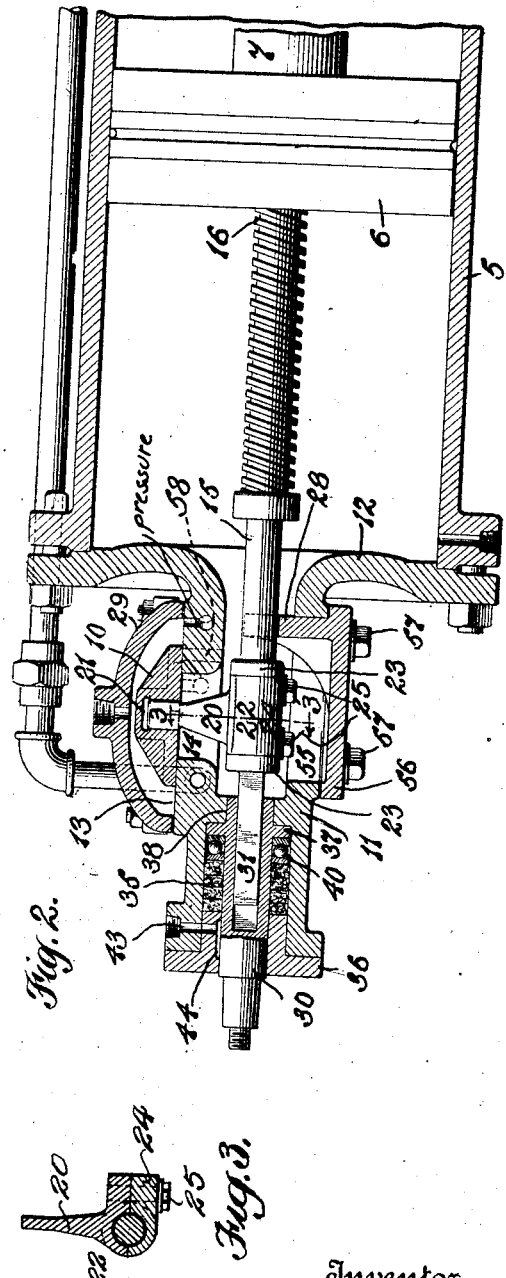
Inventor
Montague H Roberts
By Attorneys
Symes Street & Lechner Patented May 7, 1929.

1,712,120

UNITED STATES PATENT OFFICE.

MONTAGUE H. ROBERTS, OF ENGLEWOOD, NEW JERSEY, ASSIGNOR TO FRANKLIN RAILWAY SUPPLY COMPANY, A CORPORATION OF DELAWARE.

POWER REVERSE GEAR.

Application filed July 7, 1921. Serial No. 483,100.

My invention relates to power reverse gears such, for example, as those for locomotives, and is concerned with control mechanism for such gears. I aim to make the mechanism simple and effective, and to minimize the friction in it; to minimize the places where packing of relatively moving parts against leakage of fluid under pressure is required, and to minimize leakage and friction where such packing is unavoidable. How these and other advantages can be obtained through my invention will appear from my description hereinafter of the best embodiment of the invention at present known to me.

My present application is a division, in part, of my pending application Serial No. 448,044, filed February 26, 1921, certain features of its subject matter being disclosed, especially in Figs. 8 and 15 of that application.

In the drawings, Fig. 1 is a side elevation of a power reverse gear (or reverse gear actuator) conveniently embodying my invention.

Fig. 2 is a fragmentary view, on a larger scale, with the cylinder and valve casing of Fig. 1 in longitudinal mid section.

Fig. 3 is a section on the line 3—3 of Fig. 2.

The device shown in Figs. 1 and 2 comprises a power cylinder 5 in which is a fluid operated piston 6 attached to a piston rod 7 whose flat apertured end 8 is adapted to be connected to the operating element of a locomotive valve gear. The admission and exhaust of fluid to and from the cylinder 5 and movement of the piston 6 are controlled by a valve 10 associated with a casing or valve chest structure 11. As shown, the interior of this casing 11 is open to the cylinder 5 at one end, through the cylinder head 12. The valve seat 13 is to one side of the casing 11, being formed by a flat exterior surface on the casing. From the seat 13 there is an opening 14 through the casing wall laterally into its interior. From the piston 6 to the valve 10 there is a regulating actuating connection, extending into the interior of the casing 11 and through the opening 14. As shown, this connection comprises a rod 15 screw threaded into the piston at 16, and an arm 20 whose upper end is engaged in a recess 21 in the valve 10, and whose lower end 22 embraces the rod between close-fitting abutment flanges 23 thereon and is thus operatively connected to the rod. The rod-embracing lower end 22 of the arm 20 comprises a separate piece 24 secured by bolts 25. The rod 15 can turn freely with reference to the arm 20, (see Fig. 3) but the latter is constrained to move longitudinally with the rod either way.

The actuating connection between the valve 10 and the piston 6 can be varied by turning the rod 15 one way or the other, so as to screw the rod into or out of the piston and thus alter its effective length. This serves two purposes: on the one hand, it affords a means of shifting the valve 10 one way or the other from its normal central position shown, so as to initiate movement of the piston 6 by the fluid, and on the other hand, it permits the piston to occupy various positions in the cylinder 5 when the valve is in mid-position. Movement of the piston 6 due to displacement of the valve 10 either way acts through the rod 15 and the arm 20 to shift the valve in the proper direction to restore it to mid-position and thus cause the piston to be arrested in a new position; and the extent to which the piston must move to bring about its own arrest in this manner varies according to the initial displacement of the valve. Such displacement of the valve 10 either way from mid-position is limited, it will be observed, by the stop action of the flanges or collars 23 on the rod 15 in cooperation with stop abutments comprising the end of the casing 11 at the left and upstanding lug portions of a transverse web 28 at the right, so that it is impossible either to overset the valve or to force it endwise against the removable valve-chest cover 29 and thus start a leak beneath the edge of the latter.

For turning the rod 15, there is provided a rotary cylindrical member 30, mounted in the casing 11 and extending out through the end thereof opposite the cylinder head 12. This member 30 is in nonrotative sliding engagement with the left-hand end 31 of the rod 15, which is squared to fit a squared hole in said member closely but not tightly. The exposed outer end of the member 30 is tapered to take an operating part 32, and threaded to take a securing nut 33.

In the casing 11, surrounding the member 30 is a laminated annular packing 35, held in place by a fixed closure gland 36 removably secured in the end of said casing. Near its inner end, the rotary member 30 has an external shoulder or flange 37 which is kept from moving too far to the right by an internal shoulder or flange 38 in said casing. Between the flange 37 and the packing 35 is interposed a rotary antifriction ball bearing 40, comprising metal rings with raceways in their opposed faces and balls in said raceways between the rings. A hole 43 leading to a recess 44 in the internal surface of the gland 36 affords a means of lubricating the member 36.

When motive fluid under pressure is admitted to the left-hand end of the cylinder 5, the member 30 is exposed to fluid pressure. This pressure is unbalanced endwise and the endwise thrust of the member 30 due to unbalanced pressure is transmitted to the packing 35 by the bearing 40 and serves to tighten the packing upon said member 30 (or to keep it tight) most effectively at the very time when tightness is most needed. When, on the other hand, the left hand end of the cylinder 5 is opened to exhaust, the pressure of the packing 35 on the member 30 is correspondingly relieved, and likewise the frictional resistance to the turning of said member. At its tightest, moreover, the tightness of the packing 35 and the friction are definitely limited by the maximum pressure of the motive fluid (generally compressed air or steam); whereas if adjustment of the gland 36 were relied on to keep the packing 35 tight (the gland in such case not being a mere fixed closure or abutment, as here shown), a careless workman might make the packing so tight that the member 30 could scarcely be turned by hand at all.

The valve 10 may be constructed and arranged to admit fluid to the cylinder 12 in various ways which need not be here discussed, since they form no part of my present invention, and hence need not be described in detail. As shown, the valve is a simple slide valve taking motive fluid on its upper side, and it is partially balanced, owing to the access of fluid in the left hand end of the cylinder 5 to its lower side through the opening 14. In the lower side of the casing 11, opposite the opening 14, is a lateral opening 55 closed by a removable cover 56 secured in place by bolts 57 and having on its inner side, at its right-hand end, the upstanding transverse web or flange 28 above mentioned. In the upper portion of the flange 28 is a curved notch which just accommodates the rod 15. The flange 28 also serves as a dam to form a lubricating pocket in the casing 11, and lubricant introduced with the motive fluid through the port 58 directly above it accumulates in this pocket and serves to lubricate the relatively moving parts in the casing, including the rod 15, the collars 23, and bearing 40, etc. The piston-rod 7 may, of course, be hollow to accommodate the rod 15 when the piston is in or near the left-hand portion of its range of movement.

I claim:

1. Control mechanism for a fluid operated piston of a reverse gear, comprising in combination with the cylinder and cylinder head for the piston, a casing with its interior open at one end through the cylinder head into the piston cylinder, having a valve seat at one side thereof with a controlling valve, and having an opening from said seat laterally into the interior of said casing and also a lateral opening opposite that just mentioned; a valve actuating rod extending from the piston into the interior of said casing operatively connected to the control valve through the aforesaid opening from its seat; and a removable cover for the aforesaid lateral opening of said casing having on its inner side a transverse flange.

2. In a fluid operated locomotive reverse gear, the combination of a cylinder, a piston, an opening in said cylinder for the admission of fluid, a valve controlling the admission of the fluid, a connection between the valve and piston, an externally flanged rotary member exposed to the pressure of the fluid for moving said connection, a telescopic torque transmitting joint between the rotary member and the connection, packing surrounding the rotary member and a ball bearing interposed between the flange and the packing and transmitting the thrust of the rotary member to the packing to tighten it upon said member.

In testimony whereof, I have hereunto signed my name.

MONTAGUE H. ROBERTS.